United States Patent [19]
Campbell

[11] Patent Number: 5,876,165
[45] Date of Patent: Mar. 2, 1999

[54] DUNNAGE BAR

[75] Inventor: Howard W. Campbell, Grand Blanc, Mich.

[73] Assignee: Transportation Technology Group, Flint, Mich.

[21] Appl. No.: 877,713

[22] Filed: Jun. 18, 1997

[51] Int. Cl.[6] .................................. B60P 7/15; B60P 7/10
[52] U.S. Cl. .............................. 410/43; 410/32; 410/121; 410/143; 211/183; 211/41.1
[58] Field of Search .................................. 410/32, 34, 43, 410/143, 121; 211/183, 193, 162, 41.1, 94.02; 248/225.11; 428/595, 586, 603

[56] References Cited

U.S. PATENT DOCUMENTS

| | | | |
|---|---|---|---|
| 4,238,550 | 12/1980 | Burgess et al. | 428/586 |
| 4,919,277 | 4/1990 | Jeruzal | 410/43 X |
| 5,037,256 | 8/1991 | Schroder | 410/143 |
| 5,141,114 | 8/1992 | Cate, Jr. et al. | 211/162 X |
| 5,326,204 | 7/1994 | Carlson et al. | 410/143 |
| 5,378,093 | 1/1995 | Schroeder | 410/32 |
| 5,584,624 | 12/1996 | DeVoursney | 410/143 |
| 5,605,239 | 2/1997 | DeVoursney et al. | 410/143 X |

FOREIGN PATENT DOCUMENTS

| | | | |
|---|---|---|---|
| 2527307A | 11/1983 | France | 248/225.11 |

*Primary Examiner*—Stephen T. Gordon
*Attorney, Agent, or Firm*—Barnes, Kisselle, Raisch, Choate, Whittemore & Hulbert P.C.

[57] ABSTRACT

A dunnage bar construction comprises an elongated tubular bar of rectangular cross-section having an elongated slot in the inner wall thereof. A reinforcement for the tubular bar comprises an elongated channel extending lengthwise within the bar. The channel has a bottom wall spaced from the inner slotted wall and side flanges welded to the side walls of the tubular bar. The channel and the slotted inner wall define a pocket for a dunnage strip. The dunnage strip has a nose portion projecting through the slot. The reinforcement also includes an elongated brace of inverted, generally U-shape extending lengthwise within the space beneath the channel. The brace has a base in full surface-to-surface contact with and secured to the bottom wall of the channel. The brace has side flanges extending from the base into contact with the tubular bar at the intersections of the outer wall and side walls of the tubular bar.

5 Claims, 2 Drawing Sheets

DUNNAGE BAR

FIELD OF INVENTION

This invention relates generally to dunnage bars.

BACKGROUND AND SUMMARY

Dunnage bars have many uses and may, for example, form part of a rack for transporting metal stampings such as automotive vehicle door panels, hoods and rear deck lids. The dunnage bar carries a dunnage strip, which is usually of a suitable plastic or elastomeric material, that engages the metal stampings and holds them in place.

Often a rack full of metal stampings is shipped in a rail car. When the train starts or stops suddenly, the dunnage bar may be subjected to severe impact. The dunnage bar, which in some instances, is 100 inches or more in length, needs to be strong enough to withstand the impact without twisting or bending.

The dunnage bar of the present invention is an elongated, tubular, rectangular member having an inner wall provided with an elongated slot to receive a dunnage strip. Reinforcement for the bar comprises a channel within the bar, forming with the slotted wall a pocket for the dunnage strip. The reinforcement also includes an elongated, generally U-shaped brace between the bottom wall of the channel and the outer wall of the bar. Preferably, the brace has a base secured to the bottom wall of the channel, and flanges which diverge from the base and contact the dunnage bar at the intersection of its side walls and outer wall.

One object of this invention is to provide a dunnage bar construction having the foregoing features and capabilities.

Another object is to provide a dunnage bar which is composed of a relatively few simple parts, is rugged and durable in use, and is capable of being inexpensively manufactured and assembled.

These and other objects, features and advantages of the invention will become more apparent as the following description proceeds, especially when considered with the accompanying drawings.

DETAILED DESCRIPTION OF THE PREFERRED EMBODIMENT

Figure 1:
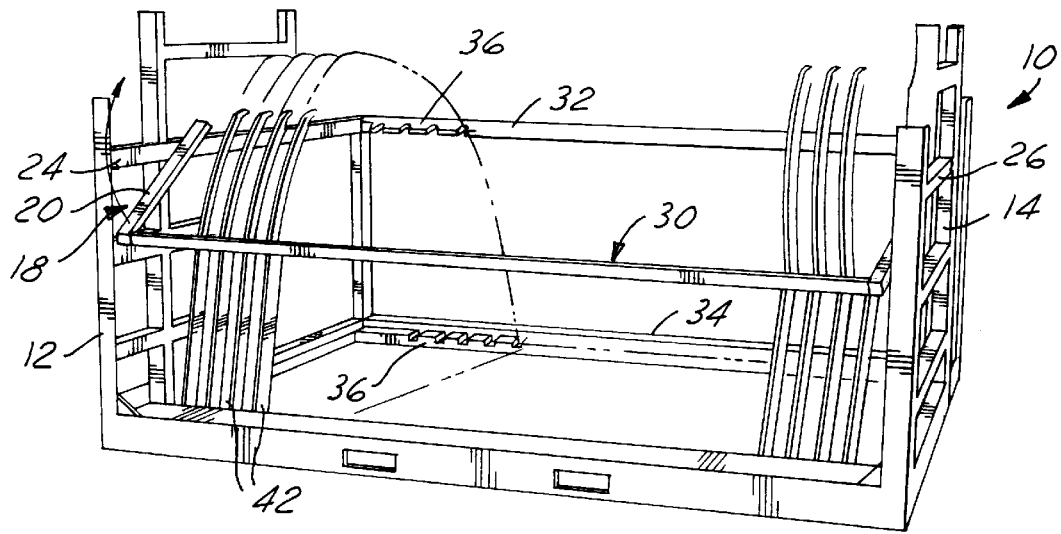
FIG. 1 is a perspective view of a rack having a dunnage bar constructed in accordance with the invention.
Figure 2:
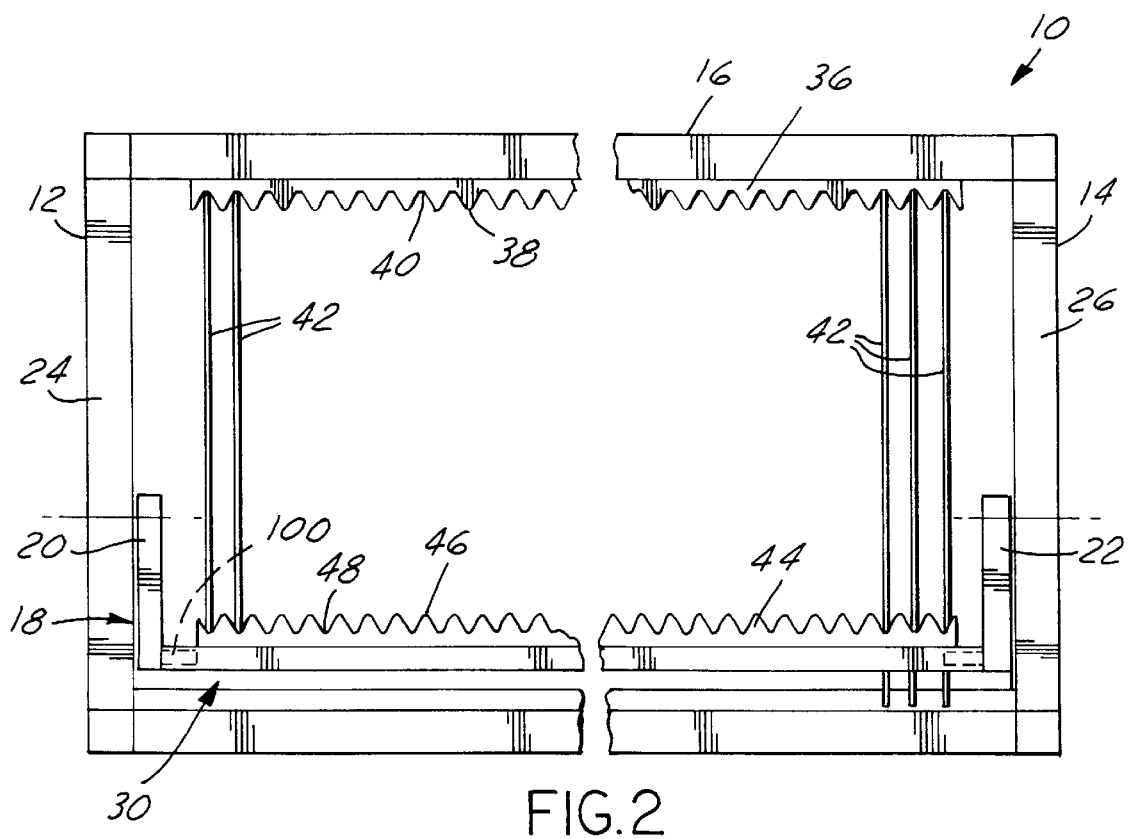
FIG. 2 is a top plan view, with parts broken away, of the rack shown in FIG. 1.

Referring now more particularly to the drawings, and especially to FIGS. 1 and 2, a rack 10 is shown having laterally spaced end walls 12 and 14 and a rear wall 16. The front of the rack is open. A swing frame 18 has laterally spaced side arms 20 and 22 having their inner ends pivoted to the top rails 24 and 26 of the respective end walls. Extending between the outer ends of the arms 20 and 22 is a horizontal dunnage bar 30 which is constructed in accordance with this invention.

The rear wall 16 of the rack has horizontally extending upper and lower rails 32 and 34 with dunnage strips 36 secured to the inner surfaces thereof. The dunnage strips 36 has alternate ribs 38 and grooves 40, the grooves 40 being adapted to receive the rear edges of metal stampings 42 supported in side-by-side relation in the rack.

The dunnage bar 30 also has a dunnage strip 44 likewise formed with alternate ribs 46 and grooves 48, with the grooves 48 engaging the front edges of the metal stampings and cooperating with the rear dunnage strips 36 in supporting the metal stampings in upright position. The bottoms of the metal stampings rest on the floor of the rack.

The swing frame 18 can be pivoted from the position shown in FIG. 1 in an upward direction indicated by the arrow to a retracted position when it is desired to load or unload metal stampings into or from the rack.

Figure 4:
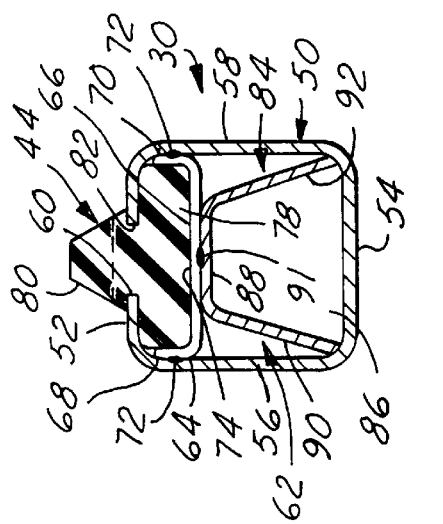
FIG. 4 is a sectional view taken on the line 4—4 in FIG. 3, showing a dunnage strip in place in the dunnage bar.
Figure 3:
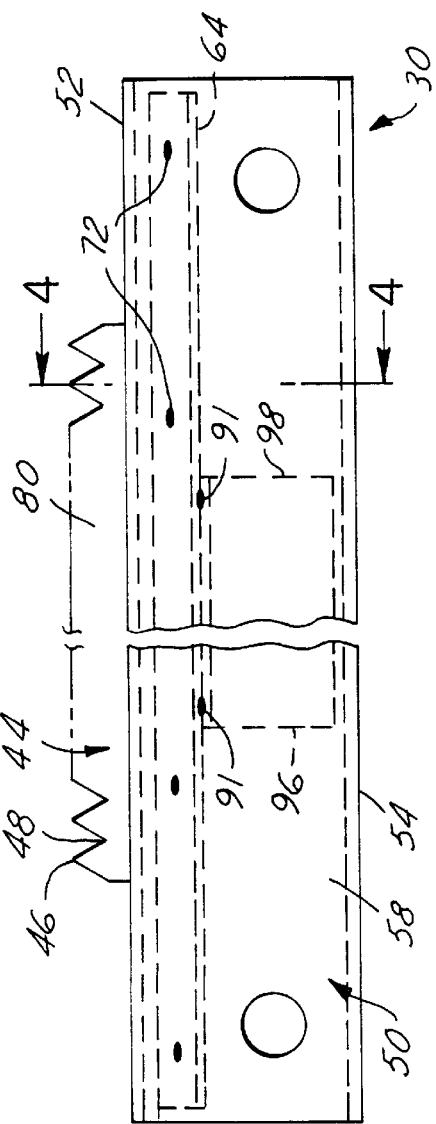
FIG. 3 is a side elevation, with parts broken away, of the dunnage bar.

The dunnage bar 30 is best shown in FIGS. 3 and 4 and will be seen to comprise an elongated metal tubular bar 50 which is open at both ends and is of rectangular cross-section throughout its length. The bar 50 has an inner wall 52, an outer wall 54 and side walls 56 and 58. The inner wall 52 of the bar 50 has an elongated slot 60 extending lengthwise of the bar from one end of the bar to the other, being open at both ends. The slot runs down the middle of the inner wall 52.

A reinforcement 62 is provided within the tubular bar 50. The reinforcement comprises an elongated metal channel 64 which extends lengthwise within the tubular bar. The channel has a flat bottom wall 66 which is spaced from and parallel to the inner wall 52 and the outer wall 54 of the bar 50. The channel has side walls 68 and 70 which extend at right angles to the bottom wall 66 toward the inner wall 52 of the bar 50. The channel 64 as seen in FIG. 3 is almost as long as the bar 50, terminating just short of both ends thereof. The side walls 68 and 70 of the channel are secured as by welding to the side walls 56 and 58 of the dunnage bar 50, the welds 72 occurring preferably at about 8 inch intervals along the length of the dunnage bar.

The channel 64 and the inner wall 52 of the bar 50 define a pocket 74 for the dunnage strip 44. The dunnage strip is preferably made of a flexible plastic or other elastomeric material and has a body portion 78 which fits within the pocket, and a nose portion 80 which projects from the pocket through the slot 60 in the inner wall 52 of the bar 50. The length of the dunnage strip 44 approximates the length of the tubular bar 50. The dunnage strip 44 has elongated grooves 82 along its full length between the body and nose portions 78 and 80 receiving the edges of the inner wall 52 on opposite sides of the slot 60 to anchor the dunnage strip therein. The dunnage strip 44 is capable of being installed in the pocket 74 and removed therefrom by sliding into or out of either end of the bar 50. The nose of the dunnage strip has the alternate ribs 46 and grooves 48 along its length, with the grooves 48 adapted to receive the front edge of the metal stampings 42.

The reinforcement 62 also includes an elongated metal brace 84 which extends lengthwise of bar 50 in the space 86 defined by the bottom wall 66 of the channel and the outer wall 54 and side walls 56 and 58 of the bar 50. The brace 84 is of inverted, generally U-shaped cross-section as shown in FIG. 4, having a base 88 and side flanges 90 and 92. The bottom wall 66 of the channel is flat and the base 88 of the brace is flat and these two are secured together in surface-to-surface relation as by welding. The welds 91 are shown in FIG. 3 at two points adjacent to the opposite ends of the brace. The base 88 of the brace is narrower than the bottom wall 66 of the channel and is centered transversely relative thereto. Each of the flanges 90 and 92 extends from the side edges of the base 88 into contact with the bar 50 at an obtuse angle to the base, with the extremities of the flanges engaging the bar 50 at the intersections of the outer wall 54 and side walls 56 and 58.

The brace 84 is somewhat shorter than the bar 50 and the channel 64, having the ends 96 and 98 spaced from the ends of the bar 50 to provide space for the insertion of holders 100 on the ends of the arms 20 and 22 of the swing frame 18 as a means for mounting the bar 50 to the swing frame.

In use, the dunnage bar 30 is attached to the arms of the swing frame by inserting the holders 100 into the opposite ends thereof, and with the nose of the dunnage strip 44 on the inner wall 52 of the tubular bar 50 facing inwardly and the grooves 48 therein engaging the edges of a row of metal stampings 42.

The reinforcement 62 on the inside of the tubular bar 50 is sufficient to resist twisting or bending of the dunnage bar which might otherwise occur when the dunnage bar is subjected to a severe impact as, for example, when the rack with which the dunnage bar is associated is being transported in a rail car of a train which starts or stops suddenly.

The reinforcement 62 is a sub-assembly which is formed apart from the tubular bar 50 by welding the channel 64 and brace 84 together at the points 91. Thereafter, the sub-assembly, consisting of the channel and brace, is inserted endwise into the tubular bar 50 and welded thereto by spot welds 72 between the side walls of the tubular bar 50 and the side walls 68 and 70 of the channel.

Figure 5:
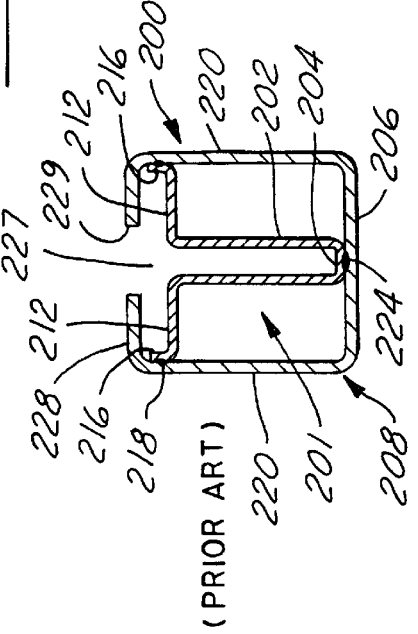

FIG. 5 shows a prior art dunnage bar 200 in a view similar to FIG. 4, but in which the reinforcement 201 is generally T-shaped as shown. The vertical portion 202 is a deep channel, the bottom wall 204 of which bears against the outer wall 206 of the rectangular tubular bar 208. The bar 208 is exactly like the bar 50 previously described. The upper extremities of the channel portion 202 have integral, laterally outwardly extending flanges 212 which terminate in right angle end portions 216 welded at 218 to the side walls 220 of the tubular bar 208. Welds 224 along the bottom of the vertical portion 202 secure the reinforcement to the outer wall 206 of the tubular bar. A dunnage strip like the one previously described, is fitted in the space 227 in the bar 208, with its nose portion projecting through the slot 229 in a wall 228. The reinforcement 201 is made in one piece and because of the concentration of load along the center of the outer wall 206, it has a tendency to distort or push the outer wall 206 outward and the entire dunnage bar to warp when a force is applied against the inner wall 228 of the tubular bar 208. If the dunnage bar of FIG. 5 were viewed from the side, the outer wall 206 would tend to dish downward in the middle because of this concentration of force.

Figure 6:
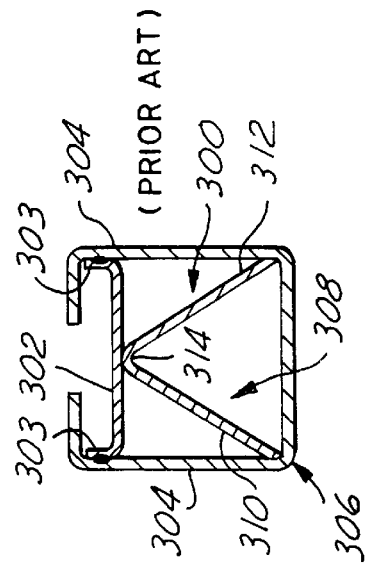
FIGS. 5 and 6 illustrate prior art constructions.

FIG. 6 shows another prior art design in which a two-part reinforcement 300 is employed, the channel 302 being similar to the channel 64 in the reinforcement shown in FIG. 4, and having its sides 303 welded to the side walls 304 of the tubular bar 306. However, the outer part of the reinforcement, which may be referred to as a brace 308, rather than being welded to the channel 302 in a sub-assembly, is loose within the dunnage bar and is merely slid into place from one end. The brace 308 is an angle member, having flanges 310 and 312, and an apex 314 engaging the middle of the channel. However, the flanges 310 and 312 are at too great an angle to one another for effective reinforcement. Also, there is a heavy concentration of load between the channel 302 and the brace at the apex 314, which has a tendency to cause the brace and the entire dunnage bar to warp.

I claim:

1. A dunnage bar construction comprising an elongated tubular bar of rectangular cross-section having an inner wall, an outer wall and two side walls, said inner wall having an elongated slot extending lengthwise of said bar, a reinforcement for said bar, said reinforcement comprising an elongated channel extending lengthwise within said bar, said channel having a flat bottom wall spaced from and parallel to said inner and outer walls of said bar and side flanges extending toward the inner wall of the bar and secured to the side walls thereof, said channel and said inner wall defining a pocket and said channel and the side walls and outer wall of said bar defining a space, a dunnage strip received in said pocket having a nose portion projecting through said slot, said reinforcement also including an elongated brace of inverted, generally U-shape within said space extending lengthwise of said bar, said brace having a flat base in full surface-to-surface contact with and secured to the flat bottom wall of said channel, and said brace having side flanges extending from said base into contact with said bar at the intersections of said outer wall and said side walls thereof.

2. A dunnage bar construction as defined in claim 1, wherein said channel and brace form a sub-assembly capable of being installed as a unit into said tubular bar.

3. A dunnage bar construction as defined in claim 2, wherein said slot is open at both ends of said tubular bar to permit the insertion and removal of the dunnage strip.

4. A dunnage bar construction as defined in claim 1, wherein said tubular bar has open ends, and said brace terminates short of the open ends of said bar to accommodate holders to be inserted therein.

5. A dunnage bar construction as defined in clam 4, wherein the base of said brace is narrower than and centered relative to the bottom wall of said channel, and each of said side flanges extend from said base into contact with said tubular bar at an obtuse angle to said base.

* * * * *